United States Patent
Li et al.

(10) Patent No.: US 10,664,445 B2
(45) Date of Patent: May 26, 2020

(54) BLOOM FILTER GENERATION METHOD AND APPARATUS

(71) Applicant: Huawei Technologies Co., Ltd., Shenzhen (CN)

(72) Inventors: Yong Li, Shenzhen (CN); Junhua Zhu, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 1074 days.

(21) Appl. No.: 15/044,273

(22) Filed: Feb. 16, 2016

(65) Prior Publication Data

US 2016/0162506 A1    Jun. 9, 2016

Related U.S. Application Data (63) Continuation of application No. PCT/CN2014/079853, filed on Jun. 13, 2014.

(51) Int. Cl.
*G06F 16/17* (2019.01)
*G06F 16/174* (2019.01)
(Continued)

(52) U.S. Cl.
CPC ......... *G06F 16/1744* (2019.01); *G06F 16/16* (2019.01); *G06F 16/24558* (2019.01)

(58) Field of Classification Search
CPC .................................................. G06F 16/16
(Continued)

(56) References Cited

U.S. PATENT DOCUMENTS 8,032,529 B2    10/2011  Gupta et al.
8,185,653 B2 *  5/2012  Yau .................... H04W 40/30
                                            709/202
(Continued)

FOREIGN PATENT DOCUMENTS

CN    101609449 A    12/2009
CN    101901248 A    12/2010
(Continued)

OTHER PUBLICATIONS

Foreign Communication From A Counterpart Application, PCT Application No. PCT/CN2014/079853, English Translation of International Search Report dated Sep. 24, 2014, 2 pages.
(Continued)

*Primary Examiner* — Baoquoc N To
(74) *Attorney, Agent, or Firm* — Conley Rose, P.C.

(57) ABSTRACT

A Bloom filter generation method and apparatus is presented, where the method includes acquiring to-be-combined files, when a quantity of deletion records in the to-be-combined files falls within a false positive permission range, acquiring a Bloom filter of each to-be-combined file, where capacities of Bloom filters of different to-be-combined files are the same, and performing a bitwise OR operation on bit values at same locations in Bloom filters of the different to-be-combined files, in order to obtain a target Bloom filter and use the target Bloom filter as a Bloom filter of a combined file obtained by combining the different to-be-combined files, and hence an amount of calculation processing in Bloom filter generation is reduced, a system resource is reduced, and resource overheads are reduced.

20 Claims, 4 Drawing Sheets

(51) Int. Cl.
*G06F 16/2455* (2019.01)
*G06F 16/16* (2019.01)

(58) Field of Classification Search
USPC .......................................... 707/769, 737, 754
See application file for complete search history.

(56) References Cited

U.S. PATENT DOCUMENTS

| | | | |
|---|---|---|---|
| 2008/0002599 A1* | 1/2008 | Yau | H04L 45/36 370/310 |
| 2008/0256094 A1 | 10/2008 | Gupta et al. | |
| 2012/0287934 A1* | 11/2012 | Sarela | H04L 45/04 370/392 |

FOREIGN PATENT DOCUMENTS

| | | |
|---|---|---|
| CN | 101923568 A | 12/2010 |
| CN | 102799617 A | 11/2012 |
| CN | 103116599 A | 5/2013 |

OTHER PUBLICATIONS

Foreign Communication From A Counterpart Application, PCT Application No. PCT/CN2014/079853, English Translation of Written Opinion dated Sep. 24, 2014, 5 pages.
Machine Translation and Abstract of Chinese Publication No. CN101901248, dated Dec. 1, 2010, 19 pages.
Machine Translation and Abstract of Chinese Publication No. CN102799617, dated Nov. 28, 2012, 10 pages.
Foreign Communication From A Counterpart Application, Chinese Application No. 201310382258.8, Chinese Office Action dated Mar. 20, 2017, 5 pages.

* cited by examiner

BLOOM FILTER GENERATION METHOD AND APPARATUS

CROSS-REFERENCE TO RELATED APPLICATIONS

This application is a continuation of International Application No. PCT/CN2014/079853, filed on Jun. 13, 2014, which claims priority to Chinese Patent Application No. 201310382258.8, filed on Aug. 28, 2013, both of which are hereby incorporated by reference in their entireties.

TECHNICAL FIELD

The present disclosure relates to the field of data processing technologies, and particular, to a Bloom filter generation method and apparatus.

BACKGROUND

With rapid development of information technologies, a data volume explosively increases, and a data storage system that can ensure security, high reliability, high extensibility, and the like of data storage becomes a main research focus in the future.

In a data storage system, to ensure a high-performance write operation including insertion, update, and deletion, an implementation manner used in the prior art is append-only. An append-only manner means that update and deletion of data does not modify existing data, but is similar to an insertion operation, that is, update data and deletion data are also written into a storage medium, and finally, final data is obtained in a data combination manner.

Insertion, update, and deletion of data are generally performed in a form of a file, each file may include multiple records, and a record can be uniquely identified using a primary key of data. Therefore, when a data write operation is performed in the foregoing manner, many records are generated, including an insertion record, an update record, a deletion record, and the like, and when data is queried, records that are not combined are also loaded and queried.

To facilitate data query, in the prior art, generally a Bloom filter is used, and a primary key of data in a file is independently stored in the Bloom filter. The Bloom filter is a random data structure with extremely high space efficiency and uses a bit array to indicate a set. When an element is added into the set, the element is mapped to K locations in the bit array using K hash functions, and bit values corresponding to the K locations are set to 1. When data is queried, whether the Bloom filter stores a primary key of to-be-queried data is queried first. If the Bloom filter stores the primary key of the to-be-queried data, a file corresponding to the Bloom filter is loaded and queried, and if the Bloom filter does not store the primary key of the to-be-queried data, this query ends.

In a process of implementing the present invention, it is found that in the prior art, because a quantity of files is extremely large and a corresponding Bloom filter is generated for each file to store a primary key of data, different Bloom filters are generated. Because when each primary key of data is stored, a hash calculation needs to be performed for multiple times using several hash functions, and a bit value corresponding to a Bloom filter is modified according to obtained hash values, an amount of calculation processing is relatively large, especially when there are a relatively large quantity of primary keys of data in a file, and an extremely large quantity of system resources are occupied.

SUMMARY

In view of this, the present disclosure provides a Bloom filter generation method, in order to resolve a technical problem in the prior art that an amount of calculation processing in Bloom filter generation is large, and a large quantity of system resources are occupied.

The present disclosure further provides a Bloom filter generation apparatus, in order to ensure implementation of the foregoing method in actual disclosure.

To achieve the foregoing objectives, the present disclosure provides the following technical solutions.

According to a first aspect, a Bloom filter generation method is provided, including acquiring to-be-combined files, where the to-be-combined files include a deletion record, when a quantity of deletion records in the to-be-combined files falls within a false positive permission range, acquiring a Bloom filter of each to-be-combined file, where capacities of Bloom filters of different to-be-combined files are the same, and performing a bitwise OR operation on bit values at same locations in the Bloom filters of the different to-be-combined files, in order to obtain a target Bloom filter and use the target Bloom filter as a Bloom filter of a combined file obtained by combining the different to-be-combined files.

In a first possible implementation manner of the first aspect, that a quantity of deletion records in the to-be-combined files falls within a false positive permission range is further that a quantity proportion of the deletion records to all records in the to-be-combined files is less than or equal to a preset threshold.

In a second possible implementation manner of the first aspect, the acquiring a Bloom filter of each to-be-combined file includes acquiring the Bloom filter that is of each to-be-combined file and that is generated according to a preset capacity, where the preset capacity is determined according to a quantity of files expected to be combined.

With reference to the second possible implementation manner of the first aspect, a third possible implementation manner of the first aspect is further provided, and the performing a bitwise OR operation on bit values at same locations in the Bloom filters of the different to-be-combined files includes, when a quantity of the to-be-combined files is less than or equal to the quantity of files expected to be combined, performing the bitwise OR operation on the bit values at the same locations in the Bloom filters of the different to-be-combined files.

With reference to the first possible implementation manner of the first aspect, a fourth possible implementation manner of the first aspect is further provided, and the method further includes detecting whether input/output (IO) pressure of a storage medium is greater than carrying pressure, if the IO pressure of the storage medium is greater than the carrying pressure, decreasing the preset threshold, and if the IO pressure of the storage medium is less than or equal to the carrying pressure, increasing the preset threshold.

With reference to the fourth possible implementation manner of the first aspect, a fifth possible implementation manner of the first aspect is further provided, and the detecting whether IO pressure of a storage medium is greater than carrying pressure further includes testing a maximum read speed of the storage medium, and detecting whether a real-time read speed of the storage medium is greater than the maximum read speed, and when the real-time read speed of the storage medium is greater than the maximum read speed, determining that the IO pressure is greater than the carrying pressure.

In a sixth possible implementation manner of the first aspect, the performing a bitwise OR operation on bit values at same locations in the Bloom filters of the different to-be-combined files, in order to obtain a target Bloom filter and use the target Bloom filter as a Bloom filter of a combined file obtained by combining the different to-be-combined files includes, at the same time of combining the to-be-combined files, performing the bitwise OR operation on the bit values at the same locations in the Bloom filters of the different to-be-combined files, in order to obtain the target Bloom filter and use the target Bloom filter as the Bloom filter of the combined file obtained by combining the different to-be-combined files.

With reference to the third possible implementation manner of the first aspect, a seventh possible implementation manner of the first aspect is further provided, and when the quantity of deletion records falls outside the false positive permission range, or the quantity of the to-be-combined files is greater than the quantity of files expected to be combined, the method further includes, when the to-be-combined files are combined, determining a primary key of data that is of each record and that is obtained in a combination process, and performing a hash calculation on a key value of the primary key of data, and mapping an obtained hash value to a corresponding location in a Bloom filter preset to be combined.

According to a second aspect, a Bloom filter generation apparatus is provided, including a first acquiring module configured to acquire to-be-combined files, where the to-be-combined files include a deletion record, a first judging module configured to determine whether a quantity of deletion records in the to-be-combined files acquired by the first acquiring module falls within a false positive permission range, a second acquiring module configured to, when a result of the first judging module is that the quantity of deletion records in the to-be-combined files acquired by the first acquiring module falls within the false positive permission range, acquire a Bloom filter of each to-be-combined file, where capacities of Bloom filters of different to-be-combined files are the same, and a first generating module configured to perform a bitwise OR operation on bit values at same locations in the Bloom filters of the different to-be-combined files, in order to obtain a target Bloom filter and use the target Bloom filter as a Bloom filter of a combined file obtained by combining the different to-be-combined files.

In a first possible implementation manner of the second aspect, that the first judging module determines whether the quantity of deletion records in the to-be-combined files acquired by the first acquiring module falls within the false positive permission range is further determining whether a quantity proportion of the deletion records to all records in the to-be-combined files is less than or equal to a preset threshold.

In a second possible implementation manner of the second aspect, that the second acquiring module acquires the Bloom filter of each to-be-combined file is further acquiring the Bloom filter that is of each to-be-combined file and that is generated according to a preset capacity, where the preset capacity is determined according to a quantity of files expected to be combined.

With reference to the second possible implementation manner of the second aspect, a third possible implementation manner of the second aspect is further provided, and the first generating module includes a second judging module configured to determine whether a quantity of the to-be-combined files is less than or equal to the quantity of files expected to be combined, and a first generating submodule configured to, when a result of the second judging module is that the quantity of to-be-combined files is less than or equal to the quantity of files expected to be combined, perform the bitwise OR operation on the bit values at the same locations in the Bloom filters of the different to-be-combined files, in order to obtain the target Bloom filter and use the target Bloom filter as the Bloom filter of the combined file obtained by combining the different to-be-combined files.

With reference to the first possible implementation manner of the second aspect, in a fourth possible implementation manner of the second aspect, the apparatus further includes a detecting module configured to detect whether IO pressure of a storage medium is greater than preset carrying pressure, and an adjusting module configured to, when a result of the detecting module is that the IO pressure of the storage medium is greater than the preset carrying pressure, decrease the preset threshold, and when the result of the detecting module is that the IO pressure of the storage medium is smaller than or equal to the preset carrying pressure, increase the preset threshold.

With reference to the fourth possible implementation manner of the second aspect, a fifth possible implementation manner of the second aspect is further provided, and the detecting module includes a testing module configured to test a maximum read speed of the storage medium, and a detecting submodule configured to detect whether a real-time read speed of the storage medium is greater than the maximum read speed, and when the real-time read speed of the storage medium is greater than the maximum read speed, determine that the IO pressure is greater than the carrying pressure.

With reference to the third possible implementation manner of the second aspect, a sixth possible implementation manner of the second aspect is further provided, and the apparatus further includes a determining module configured to, when the result of the first judging module is that the quantity of deletion records in the to-be-combined files acquired by the first acquiring module falls outside the false positive permission range, or when the result of the second judging module is that the quantity of to-be-combined files is greater than the quantity of files expected to be combined, determine, when the to-be-combined files are combined, a primary key of data that is of each record and that is obtained in a combination process, and a second generating module configured to perform a hash calculation on a key value of the primary key of data, and map an obtained hash value to a corresponding location in a Bloom filter preset to be combined.

It can be learned from the foregoing technical solutions that, compared with the prior art, the present disclosure provides a Bloom filter generation method and apparatus for acquired to-be-combined files, when a quantity of deletion records in the to-be-combined files falls within a false positive permission range, a bitwise OR operation is performed on bit values at same locations in Bloom filters of the to-be-combined files, and an obtained target Bloom filter is used as a Bloom filter of a combined file. In the present disclosure, there is no need to perform a hash function calculation on each element of the combined file, that is, each primary key of data for multiple times, and to perform an operation such as mapping and modifying a bit value of the Bloom filter, and the Bloom filter of the combined file may be directly obtained in a combination manner, which reduces an amount of calculation processing, especially when there are a relatively large quantity of primary keys of data in the combined file, which can greatly reduce the amount of calculation processing, reduce occupation of a system resource, and reduce resource overheads.

BRIEF DESCRIPTION OF DRAWINGS

To describe the technical solutions in the embodiments of the present disclosure more clearly, the following briefly introduces the accompanying drawings required for describing the embodiments.

DESCRIPTION OF EMBODIMENTS

The following clearly describes the technical solutions in the embodiments of the present disclosure with reference to the accompanying drawings in the embodiments of the present disclosure.

One of main ideas of the present disclosure may include the following steps: acquiring to-be-combined files, where each to-be-combined file includes at least one record, and when a quantity of deletion records in the to-be-combined files falls within a false positive permission range, separately performing a bitwise OR operation on bit values at same locations in Bloom filters of the to-be-combined files, and using an obtained target Bloom filter as a Bloom filter of a combined file. Therefore, there is no need to perform a hash function calculation on each element of the combined file, that is, each primary key of data for multiple times, and to perform an operation such as mapping and modifying a bit value of a Bloom filter, and the Bloom filter of the combined file can be directly obtained in a combination manner, which reduces an amount of calculation processing, reduces occupation of a system resource, and reduces resource overheads.

Figure 1A:
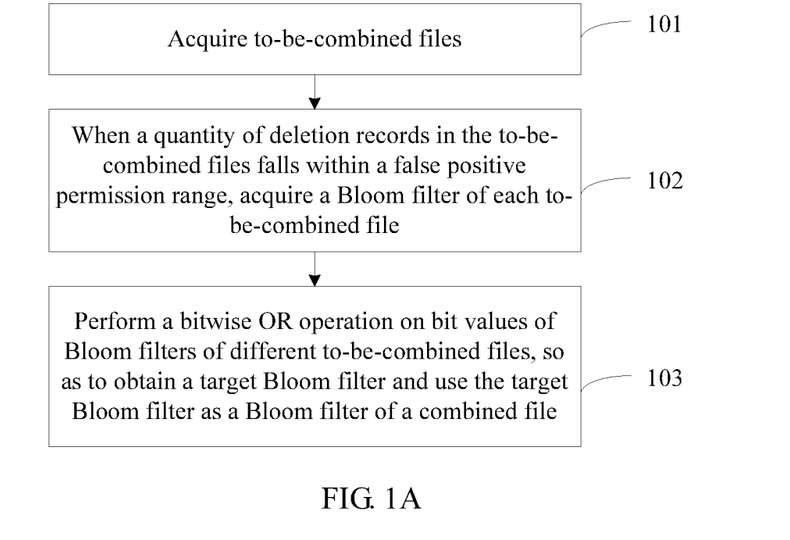
FIG. 1A is a flowchart of an embodiment of a Bloom filter generation method according to the present disclosure.

FIG. 1A is a flowchart of an embodiment of a Bloom filter generation method according to the present disclosure, and the method may include the following several steps.

Step 101: Acquire to-be-combined files.

There are multiple to-be-combined files, each to-be-combined file includes at least one record, and the record may be an insertion record, an update record, or a deletion record. In this embodiment of the present disclosure, the to-be-combined files include a deletion record. The to-be-combined files may further include an insertion record and/or an update record.

In a write operation in which an append-only manner is used, the to-be-combined files are files generated when write operations are performed at different moments. In the append-only manner, an update operation and a delete operation of data do not directly modify existing data in a storage medium, but instead, update data and deletion data are written into the storage medium in the append-only manner, and final data is obtained in a combination manner. Therefore, the to-be-combined files are files that need to be subsequently combined.

The following tables indicate three to-be-combined files:

TABLE 1

| User001 | Mike | 35 | 175 | User002 | Jane | 32 | 160 |

TABLE 2

| User001 | 36 |

TABLE 3

| User002 (Delete) |

A file at a Table 1 moment includes two insertion records used to insert records User001 and User002, and a file at a Table 2 moment includes an update record used to update the record User001. A file at a Table 3 moment includes a deletion record used to delete the record User002. It can be learned from the files at the Table 2 and Table 3 moments that an update operation and a delete operation of the files do not directly modify data in the storage medium, but instead, new files are generated.

A combined file obtained by combining the foregoing three to-be-combined files is:

| User001 | Mike | 36 | 175 |

A corresponding delete tag (such as a Delete tag in the record User002 as shown in file Table 3 of the foregoing example) may be set for a deletion record in a file in order to distinguish the deletion record from another type of record.

Each to-be-combined file includes at least one record, in the file at the Table 1 moment in the foregoing example, data corresponding to User001 and data corresponding to User002 are two records, and the data in the records has different data attributes. In the foregoing example, an attribute of Mike is "name", an attribute of 35 is "age", and an attribute of 175 is "height". A primary key of data, that is, a primary attribute of data may uniquely identify a record, attributes of User001 and User002 in the foregoing example are "user identity" which is a primary key of data, and User001 and User002 are key values of the primary key of data.

The to-be-combined files may be acquired in multiple manners, and a possible manner is acquiring files generated within a specific time range and using the files as the to-be-combined files. Different to-be-combined files may be generated at different moments.

In addition, acquiring the to-be-combined files may be further acquiring to-be-combined files of similar file sizes, that is, a difference in file sizes of the acquired to-be-combined files falls within a preset range.

A quantity of the acquired to-be-combined files may be greater than a first preset value and not less than a second preset value.

Certainly, the to-be-combined files may also be acquired in another manner, which is introduced in detail in the following embodiment.

Step 102: When a quantity of deletion records in the to-be-combined files falls within a false positive permission range, acquire a Bloom filter of each to-be-combined file.

Each to-be-combined file includes at least one record, and then multiple to-be-combined files include multiple records. The quantity of deletion records in this embodiment refers to a quantity of deletion records in all records included in all the to-be-combined files.

Capacities of Bloom filters of different to-be-combined files are the same.

The false positive permission range is determined according to an expected false positive rate used when data is queried using a Bloom filter, and if a false positive rate of actual query falls within the false positive permission range, it can be considered that the query is accurate.

In a storage system that uses a Bloom filter to implement data query, because before the to-be-combined files are combined, files on which the data query is performed also include these to-be-combined files, a corresponding Bloom filter is generated for each to-be-combined file.

A Bloom filter is a set represented using a bit array, and a capacity of the Bloom filter may be represented using an array bit width and is measured in bits.

Figure 1B:
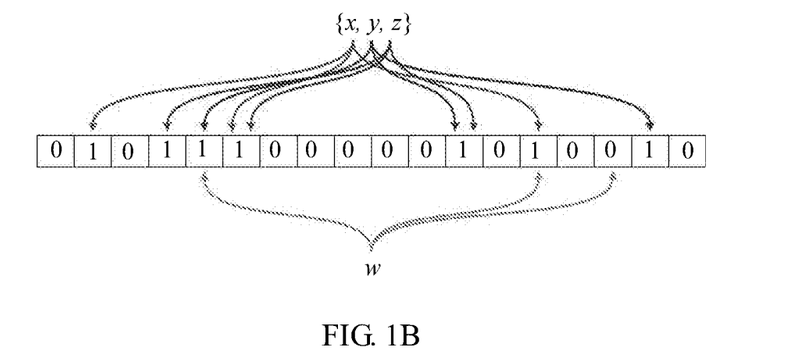
FIG. 1B is a schematic diagram of a Bloom filter according to the present disclosure.

FIG. 1B shows a schematic diagram of a Bloom filter, a capacity of the Bloom filter shown in FIG. 1B is 18 bits, and an initial bit value at each location is 0. It is assumed that three mutually independent hash functions are used in the Bloom filter to map each element to a range of this set. In FIG. 1B, an element x, an element y, and an element z are respectively mapped to corresponding locations in this set, and bit values at the corresponding locations are set to 1. When data is queried, for example, an element w is queried, w may be first mapped to this set using the three mutually independent hash functions. If there is 1 at all mapped locations, it indicates that a file corresponding to the Bloom filter includes the element w, and if there is a 0, it indicates that the element w does not exist.

In this embodiment, a capacity of the Bloom filter of each to-be-combined file needs to be the same, and the capacity of the Bloom filter may be preset. Because there may be a false positive situation when whether an element belongs to a set of a Bloom filter is determined, and a Bloom filter capacity is related to a false positive rate of data query, a larger Bloom filter capacity leads to a smaller false positive rate. Therefore, the capacity of the Bloom filter may be determined according to an expected false positive rate, such that an actual false positive rate can fall within the false positive permission range, in order to improve data query accuracy.

Step 103: Perform a bitwise OR operation on bit values of Bloom filters of different to-be-combined files, in order to obtain a target Bloom filter and use the target Bloom filter as a Bloom filter of a combined file obtained by combining the different to-be-combined files.

When the quantity of deletion records in the to-be-combined files falls within the false positive permission range, it indicates the deletion record may be ignored, and existence of the deletion record does not affect the data query accuracy. In this case, in this embodiment of the present disclosure, to obtain the Bloom filter of the combined file obtained by combining the to-be-combined files, there is no need to perform a hash calculation using a hash function on each primary key of data of the combined file and an operation such as mapping and modifying a bit value of the Bloom filter, but instead, a bitwise OR operation is separately performed on the bit values at the same locations in the Bloom filters of the different to-be-combined files, such that the obtained target Bloom filter can be used as the Bloom filter of the combined file. Therefore, on a premise of ensuring the false positive rate of the data query, generation of the Bloom filter of the combined file is simplified.

The deletion record in the to-be-combined files may be determined according to whether a delete tag is carried in a record, such that a relationship between the quantity of deletion records and a quantity of all records in the to-be-combined files can be determined.

The quantity of deletion records falls within the false positive permission range, and a possible manner is that a quantity proportion of the deletion records to all the records in the to-be-combined files is less than or equal to a preset threshold. That is, a proportion of the quantity of deletion records to the quantity of all records in the to-be-combined files is less than or equal to the preset threshold. A smaller quantity of deletion records leads to a more accurate query result and a smaller false positive rate. The preset threshold may be determined according to the expected false positive rate.

When the quantity of deletion records falls within the false positive permission range, a bit value of the Bloom filter of the combined file is obtained by separately performing the bitwise OR operation on the bit values at the same locations in the Bloom filters of the different to-be-combined files.

Figure 1C:
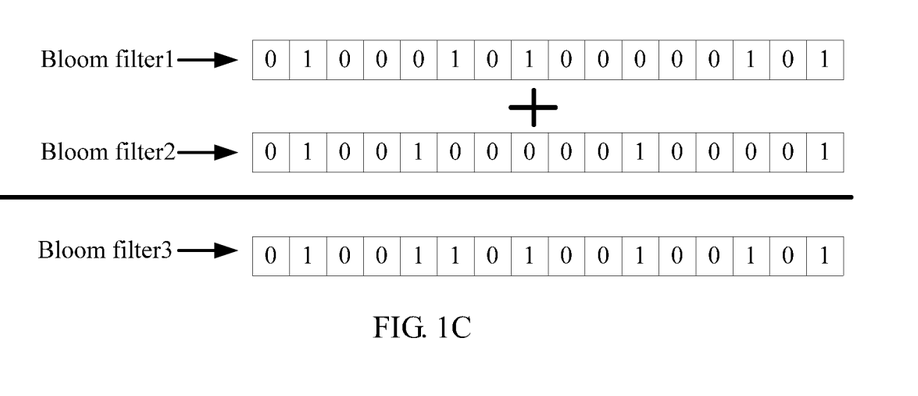
FIG. 1C is a schematic diagram of combining Bloom filters according to the present disclosure.

As shown in FIG. 1C, FIG. 1C is a schematic diagram of combining Bloom filters. A bitwise OR operation is separately performed on bit values at same locations in Bloom filter 1 of a to-be-combined file and Bloom filter 2 of another to-be-combined file, such that Bloom filter 3 can be obtained by means of combination.

In this embodiment, the performing a bitwise OR operation on bit values at same locations in the Bloom filters of the different to-be-combined files, in order to obtain a target Bloom filter and use the target Bloom filter as a Bloom filter of a combined file obtained by combining the different to-be-combined files may be performed at the same time of combining the to-be-combined files, or may be performed after combination of the to-be-combined files is completed.

After combination of the to-be-combined files is completed and the combined file is generated, the to-be-combined files are deleted from the storage medium, and when data is queried, only the combined file is loaded and queried.

In this embodiment, for to-be-combined files, when a quantity of deletion records in the to-be-combined files falls within a false positive permission range, a bitwise OR operation is separately performed on bit values at same locations in Bloom filters of different to-be-combined files, and an obtained target Bloom filter is used as a Bloom filter of a combined file. Therefore, there is no need to perform a hash function calculation on each element of the combined file, that is, each primary key of data for multiple times, and to perform an operation such as mapping and modifying a bit value of the Bloom filter, and the Bloom filter of the combined file may be obtained in a combination manner, which reduces an amount of calculation processing, reduces occupation of a system resource, and reduces resource overheads.

Figure 2:
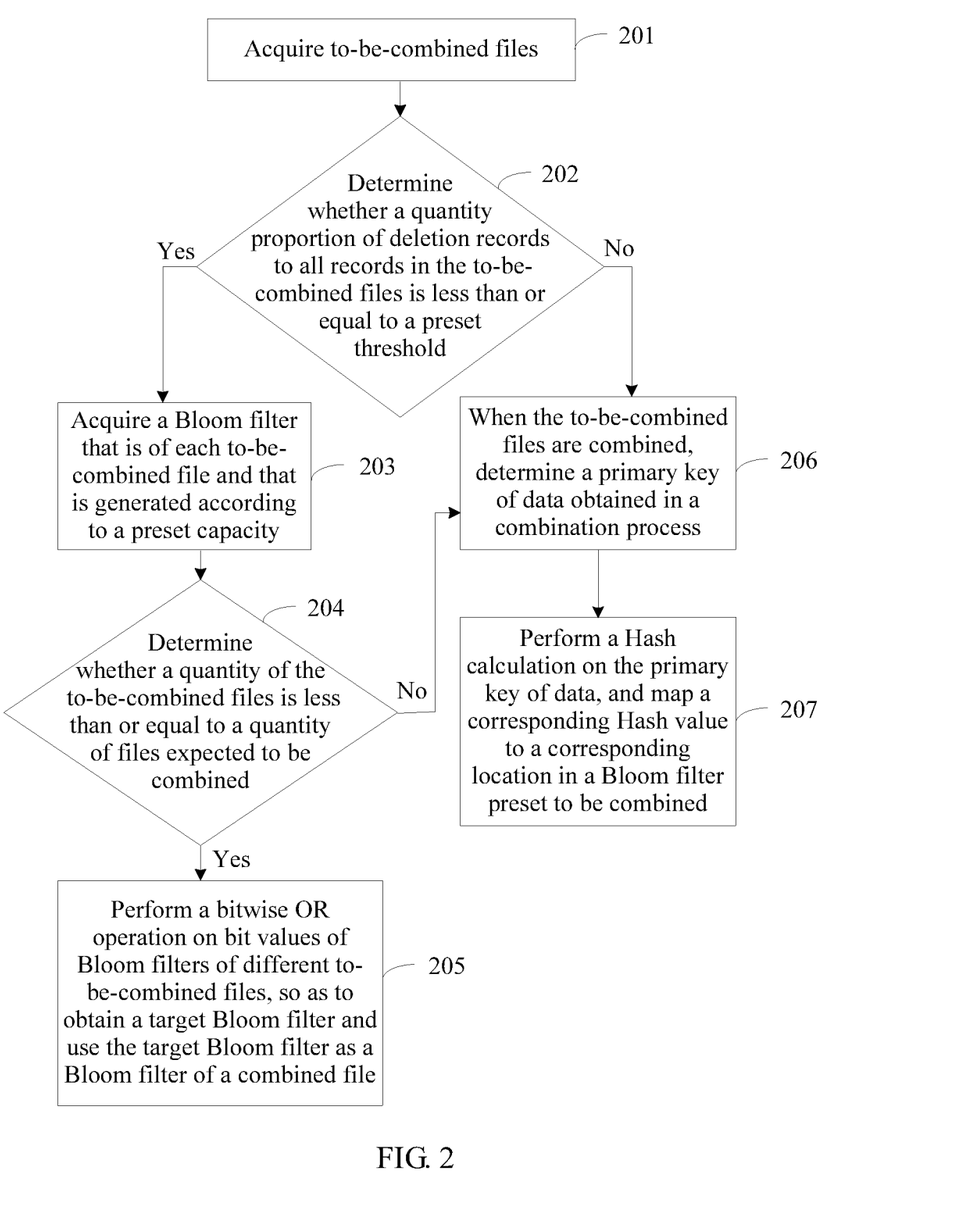
FIG. 2 is a flowchart of another embodiment of a Bloom filter generation method according to the present disclosure.

FIG. 2 is a flowchart of another embodiment of a Bloom filter generation method according to the present disclosure, and the method may include the following several steps:

Step 201: Acquire to-be-combined files.

The to-be-combined files include a deletion record.

To obtain to-be-combined files of similar sizes, the acquiring to-be-combined files may be further executed in the following manner: sequentially saving files in a preset file set according to moments of generating the files, and when a size of a target file in the preset file set is less than or equal to a first preset multiple of an average size of files saved before the target file, and is greater than or equal to a second preset multiple of the average size of the files saved before the target file, determining that the target file is a to-be-combined file.

The first preset multiple and the second preset multiple may be further set according to an actual disclosure situation.

When the to-be-combined files are acquired, a file set is first preset. Files are sequentially inserted into the file set according to different moments of generating the files. For any file in the file set, if a size of the file is less than or equal to a first preset multiple of an average size of files saved before the file (that is, files in the file set that have been generated before the file is generated), and is greater than or equal to a second preset multiple of the average size of the files saved before the file, the file is used as a to-be-combined file. To-be-combined files determined in this manner are files of similar sizes.

Step 202: Determine whether a quantity proportion of deletion records to all records in the to-be-combined files is less than or equal to a preset threshold, and if yes, go to step 203, and if no, go to step 206.

A smaller quantity of deletion records in the to-be-combined files leads to more accurate subsequent query and a smaller false positive rate. The preset threshold may be determined according to an expected false positive rate, where the expected false positive rate is a false positive rate that is acceptable when data is queried.

The preset threshold may further be dynamically adjusted according to IO pressure of a storage medium. If the IO pressure is excessively large, it indicates that an increase of a quantity of reading times of the storage medium may be caused by an increase of the false positive rate, and the preset threshold may be decreased. If the IO pressure is excessively small, the preset threshold may be increased. A specific execution process is detecting whether the IO pressure of the storage medium is greater than carrying pressure, if the IO pressure of the storage medium is greater than the carrying pressure, decreasing the preset threshold, and if the IO pressure of the storage medium is less than or equal to the carrying pressure, increasing the preset threshold.

The detecting whether IO pressure of the storage medium is greater than carrying pressure may be performed in real time, such that the preset threshold can be relatively accurate, a Bloom filter that is generated subsequently is more accurate, and a false positive rate of data query can be reduced.

The decreasing the preset threshold or the increasing the preset threshold may be implemented in multiple manners, for example, a current preset threshold is decreased or increased by a preset value each time, or the current preset threshold is decreased or increased to a specific value. The present disclosure sets no specific limitation thereto.

A possible implementation manner of the detecting whether the IO pressure of the storage medium is greater than carrying pressure is testing a maximum read speed of the storage medium, and detecting whether a real-time read speed of the storage medium reaches the maximum read speed, and when the real-time read speed of the storage medium reaches the maximum read speed, determining that the IO pressure is greater than the carrying pressure.

The maximum read speed may be tested using an Iometer testing tool, and an Iometer is a tool that works on a single system and a cluster system and that is used to measure and describe IO, and the Iometer may detect and record performance of an IO operation and impact of the IO operation on a system.

When the real-time read speed of the storage medium reaches the maximum read speed, it may be considered that the IO pressure is relatively large and an increase of a quantity of misreading times of a disk may be caused by an increase of the false positive rate, and therefore, the preset threshold may be decreased. Otherwise, the preset threshold may be increased.

Step 203: Acquire a Bloom filter that is of each to-be-combined file and that is generated according to a preset capacity.

Step 204: Determine whether a quantity of the to-be-combined files is less than or equal to a quantity of files expected to be combined, and if yes, go to step 205, and if no, go to step 206.

Step 205: Perform a bitwise OR operation on bit values of Bloom filters of different to-be-combined files, in order to obtain a target Bloom filter and use the target Bloom filter as a Bloom filter of a combined file obtained by combining the different to-be-combined files.

Preset capacities of the Bloom filters of the different to-be-combined files are the same. The preset capacity is related to the quantity of files expected to be combined.

The false positive rate of the data query has the following relationship with a file and a Bloom filter of the file:

$$f(1-e^{-kn/m})^k,$$

where f represents the false positive rate, k is a quantity of hash functions, n is a quantity of primary keys of data in the file, and m is a capacity of the Bloom filter of the file.

Therefore, according to the foregoing relational expression, a calculation formula of a minimum capacity of the Bloom filter may be obtained, that is:

$$m = n * \log_2 e * \log_2(1/f)$$
$$\approx n * 1.44 * \log_2(1/f).$$

It can be learned from the foregoing description that, in a case in which the false positive rate is determined, the minimum capacity of the Bloom filter of the file is related to the quantity of primary keys of data in the file.

Because in this embodiment, the Bloom filter of the combined file may be obtained by combining the Bloom filters of the different to-be-combined files, it can be learned from the foregoing description that, to ensure a specific false positive rate, the expected false positive rate may be set. In this case, the minimum capacity of the Bloom filter is related to the quantity of primary keys of data. In the present disclosure, to make the Bloom filter of the combined file obtained by combining the to-be-combined files meet the expected false positive rate, in this embodiment, a calculation formula of a capacity of a Bloom filter of each file, that is, a calculation formula of the preset capacity is:

$$M \geq N * m$$
$$\geq N * n * \log_2 e * \log_2(1/f)$$
$$\geq N * n * 1.44 * \log_2(1/f),$$

where N is the quantity of files expected to be combined, and m is a minimum capacity of a Bloom filter of a file. It can be learned from the foregoing formula that, the preset capacity is related to the quantity of files expected to be combined, that is, when a quantity of primary keys of data of a file is determined, a minimum capacity of a Bloom filter of the file is determined, and the preset capacity is related to the quantity of files expected to be combined.

Because quantities of primary keys of data included in the to-be-combined files differ to some extent, to ensure a requirement that a capacity of the Bloom filter of the combined file obtained by combining satisfy the expected false positive rate, the quantity of primary keys of data may be determined according to a to-be-combined file that includes a maximum quantity of primary keys of data.

In a case in which the preset capacity is determined, a hash function used for each to-be-combined file may also be determined, that is:

$$k = \ln 2 * \frac{m}{n},$$

where both m and n may be corresponding values corresponding to the to-be-combined file that includes the maximum quantity of primary keys of data.

With reference to the foregoing description, the preset capacity is a capacity that can ensure the expected false positive rate and that is determined according to the quantity of files expected to be combined. Therefore, when the quantity of to-be-combined files is less than or equal to the quantity of files expected to be combined, the Bloom filter of the combined file may be generated in the manner of step 205.

Step 206: When the to-be-combined files are combined, determine a primary key of data that is of each record and that is obtained in a combination process.

Step 207: Perform a hash calculation on a key value of the primary key of data, and map a corresponding hash value to a corresponding location in a Bloom filter preset to be combined.

When the quantity proportion of the deletion records to all the records in the to-be-combined files is greater than the preset threshold, or the quantity of to-be-combined files is greater than the quantity of files expected to be combined, the Bloom filter that is of the combined file and that is determined in the manner of step 205 cannot meet an expected false positive rate requirement. Therefore, the Bloom filter of the combined file may be generated by means of a hash calculation and according to a primary key of data that is of the combined file and that is determined when the to-be-combined files are combined. When the expected false positive rate is determined, a capacity of the Bloom filter preset to be combined may be determined according to a formula m=n*log$_2$e*log$_2$(1/f)≈n*1.44*log$_2$(1/f).

The to-be-combined files are combined in a recursive combination manner. For three files shown in the following table, each file includes four primary keys of data, and the primary keys of data in each file are arranged according to a size of a key value.

| File 1: | | | |
|---|---|---|---|
| User001 | User003 | User005 | User006 |

| File 2: | | | |
|---|---|---|---|
| User001 | User002 | User006 | User007 |

| File 3: | | | |
|---|---|---|---|
| User002 | User003 | User008 | User009 |

When the to-be-combined files are combined, at a Table 1 moment, primary keys of data of the respective to-be-combined files are sequentially and iteratively read and are respectively {User001, User001, User002}, where a minimum value is "User001", record data corresponding to these two "User001" respectively are combined, and a combination result is written into a combined file.

At a Table 2 moment, primary keys of data of the respective to-be-combined files are sequentially and iteratively read. Since User002 in file 3 is not used at the Table 1 moment, primary keys of data read at the Table 2 moment include {User003, User002, User003}, where "User002" is the smallest, and there is only one User002, and record data corresponding to "User002" is directly written into the combined file.

By analogy, a primary key of data with a minimum key value is selected from primary keys of data iteratively read each time, data corresponding to the primary key of data is combined and written into the combined file, and a combined file can be finally obtained.

For a primary key of data that is of the combined file and that is obtained by iterative reading each time, for example, "User001" at the T1 moment or "User002" at the T2 moment, a hash calculation is concurrently performed on a key value of the primary key of data using K hash functions, and an obtained hash value is mapped to a corresponding location in a Bloom filter preset to be combined, and a bit value of the Bloom filter is modified. After combination of the to-be-combined files is completed, establishment of the Bloom filter corresponding to the combined file is completed.

In this embodiment, for to-be-combined files, when a quantity proportion of deletion records in to-be-combined files to all records in the to-be-combined files is less than or equal to a preset threshold, and a quantity of to-be-combined files is less than a quantity of files expected to be combined, a bitwise OR operation is separately performed on bit values at same locations in Bloom filters that are of the to-be-combined files and that are generated according to a preset capacity, and an obtained target Bloom filter is used as a Bloom filter of a combined file. Therefore, there is no need to perform a hash function calculation on each element of the combined file, that is, a primary key of data for multiple times, and to perform an operation such as mapping and modifying a bit value of the Bloom filter, and the Bloom filter of the combined file may be directly obtained in a combination manner, which reduces an amount of calculation processing, reduces occupation of a processor and a memory resource, and reduces overheads.

For ease of description, each of the previous method embodiments is described as a combination of a series of actions. However, a person skilled in the art should understand that the present disclosure is not limited to the described sequence of the actions, because steps according to the present disclosure may be performed in other sequences or concurrently. In addition, a person skilled in the art should also understand that the embodiments described herein are exemplary embodiments, and the involved actions and modules mentioned are not necessarily required by the present disclosure.

The technical solutions of the present disclosure are further applicable to a key-value distributed storage system, and the key-value distributed storage system is widely applied because of advantageous performance of the distributed storage system, such as high availability and high extensibility. In the key-value distributed storage system, to support a quicker write operation, a write operation of a data file supports only an append-only manner. Therefore, a Bloom filter generated according to the technical solutions of the present disclosure can not only ensure a false positive rate of data query and query accuracy, but also can reduce an amount of calculation processing, reduce occupation of a system resource, and reduce resource overhead.

Figure 3:
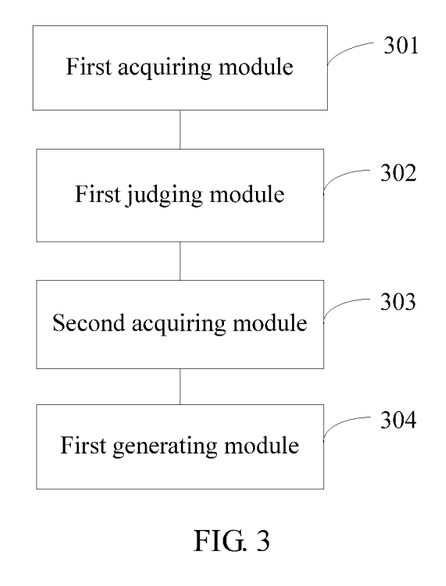
FIG. 3 is a schematic structural diagram of an embodiment of a Bloom filter generation apparatus according to the present disclosure.

FIG. 3 is a schematic structural diagram of an embodiment of a Bloom filter generation apparatus according to the present disclosure, and the apparatus may include a first acquiring module 301, a first judging module 302, a second acquiring module 303, and a first generating module 304.

The first acquiring module 301 is configured to acquire to-be-combined files.

The to-be-combined files include a deletion record, and in this embodiment of the present disclosure, the to-be-combined files may further include an insertion record and/or an update record.

The first judging module 302 is configured to determine whether a quantity of deletion records in the to-be-combined files acquired by the first acquiring module 301 falls within a false positive permission range.

The false positive permission range is determined according to an expected false positive rate used when data is queried using a Bloom filter, and if a false positive rate of actual query falls within the false positive permission range, it can be considered that the query is accurate.

The second acquiring module 303 is configured to, when a result of the first judging module 302 is yes, acquire a Bloom filter of each to-be-combined file.

Capacities of Bloom filters of different to-be-combined files are the same.

In a storage system that uses a Bloom filter to implement data query, because before the to-be-combined files are combined, files on which the data query is performed also include these to-be-combined files, a Bloom filter is generated for each to-be-combined file.

A Bloom filter is a set represented using a bit array, and a capacity of the Bloom filter may be represented using an array bit width and is measured in bits.

A capacity of the Bloom filter of each to-be-combined file needs to be the same, and the capacity of the Bloom filter may be preset. Because there may be a specific false positive rate when whether an element belongs to a Bloom filter is determined, the capacity of the Bloom filter may be determined according to an expected false positive rate, such that an actual false positive rate can fall within the false positive permission range.

The first generating module 304 is configured to separately perform a bitwise OR operation on bit values at same locations in the Bloom filters of the different to-be-combined files, in order to obtain a target Bloom filter and use the target Bloom filter as a Bloom filter of a combined file obtained by combining the different to-be-combined files.

When the quantity of deletion records in the to-be-combined files falls within the false positive permission range, it indicates the deletion record may be ignored, and existence of the deletion record does not affect data query. In this case, for the Bloom filter of the combined file obtained by combining the to-be-combined files. There is no need to perform a hash calculation using a hash function on each primary key of data of the combined file and an operation such as mapping and modifying a bit value of the Bloom filter, but instead, a bitwise OR operation is separately performed on the bit values at the same locations in the Bloom filters of the different to-be-combined files, such that the obtained target Bloom filter can be used as the Bloom filter of the combined file. Therefore, on a premise of ensuring the false positive rate, generation of the Bloom filter of the combined file is simplified.

The deletion record may be determined according to whether a delete tag is carried in a record in the to-be-combined files, such that a relationship between the quantity of deletion records and a quantity of all records in the to-be-combined files can be determined.

The separately performing a bitwise OR operation on bit values at same locations in the Bloom filters of the different to-be-combined files, in order to obtain a target Bloom filter and use the target Bloom filter as a Bloom filter of a combined file obtained by combining the different to-be-combined files may be performed at the same time of combining the to-be-combined files, or may be performed after combination of the to-be-combined files is completed.

In this embodiment, for to-be-combined files, when a quantity of deletion records in the to-be-combined files falls within a false positive permission range, a bitwise OR operation is separately performed on bit values at same locations in Bloom filters corresponding to different to-be-combined files, and an obtained target Bloom filter is used as a Bloom filter of a combined file. Therefore, there is no need to perform a hash function calculation on each element of the combined file, that is, a primary key of data for multiple times, and to perform an operation such as mapping and modifying a bit value of the Bloom filter, and using the apparatus in this embodiment, the Bloom filter of the combined file may be directly obtained in a combination manner, which reduces an amount of calculation processing, reduces occupation of a processor and a memory resource, and reduces overheads.

Figure 4:
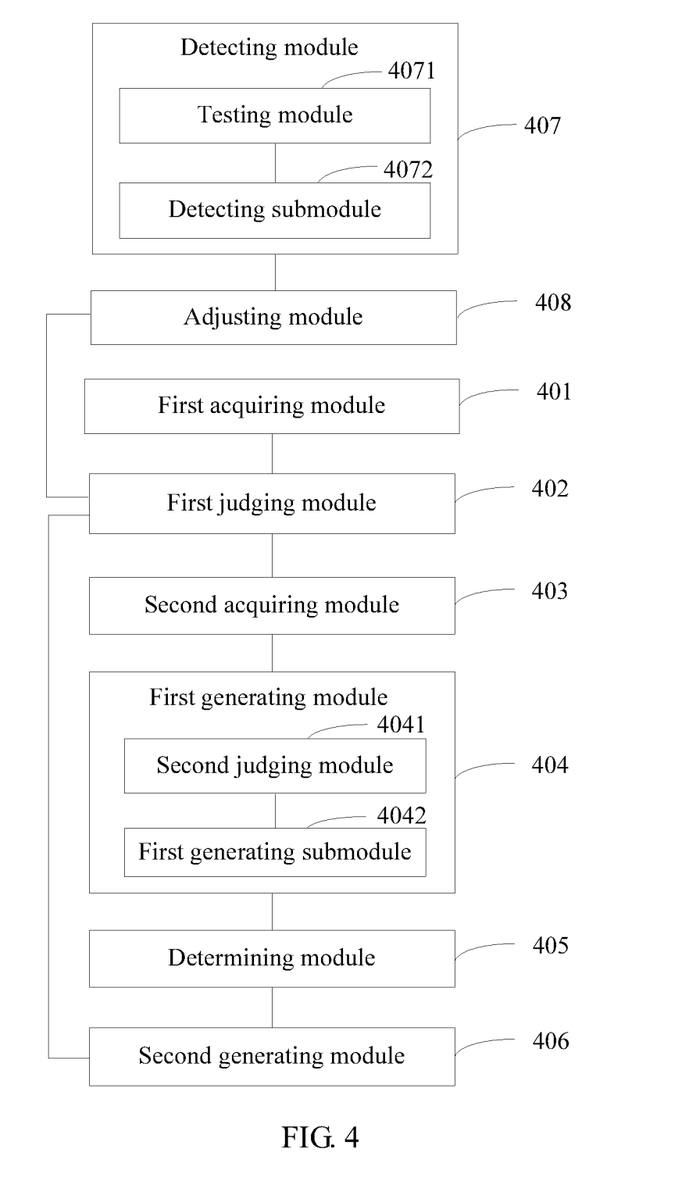
FIG. 4 is a schematic structural diagram of another embodiment of a Bloom filter generation apparatus according to the present disclosure.

FIG. 4 is a schematic structural diagram of another embodiment of a Bloom filter generation apparatus according to the present disclosure, and the apparatus may include a first acquiring module 401, a first judging module 402, a second acquiring module 403, a first generating module 404, a determining module 405, and a second generating module 406.

The first acquiring module 401 is configured to acquire to-be-combined files.

The to-be-combined files include a deletion record.

The acquiring to-be-combined files may be further executed in the following manner: sequentially saving files in a preset file set according to moments of generating the files, and when a size of a target file in the preset file set is less than or equal to a first preset multiple of an average size of files saved before the target file, and is greater than or equal to a second preset multiple of the average size of the files saved before the target file, determining that the target file is a to-be-combined file.

To-be-combined files determined in this manner are files of similar sizes.

The first judging module 402 is configured to determine whether a quantity proportion of the deletion records in the to-be-combined files acquired by the first acquiring module to all records in the to-be-combined files is less than or equal to a preset threshold.

A smaller quantity of deletion records leads to more accurate subsequent query and a smaller false positive rate. The preset threshold may be a limiting value determined according to an expected false positive rate.

The second acquiring module 403 is configured to, when a result of the first judging module is that the quantity of deletion records in the to-be-combined files acquired by the first acquiring module falls within the false positive permission range, acquire a Bloom filter that is of each to-be-combined file and that is generated according to a preset capacity.

The first generating module 404 is configured to perform a bitwise OR operation on bit values at same locations in Bloom filters of different to-be-combined files, in order to obtain a target Bloom filter and use the target Bloom filter as a Bloom filter of a combined file obtained by combining the different to-be-combined files.

The first generating module 404 may include a second judging module 4041 configured to determine whether a quantity of the to-be-combined files is less than or equal to a quantity of files expected to be combined, and a first generating submodule 4042 configured to, when a result of the second judging module is that the quantity of to-be-combined files is less than or equal to the quantity of files expected to be combined, perform the bitwise OR operation on the bit values at the same locations in the Bloom filters of the different to-be-combined files, in order to obtain the target Bloom filter and use the target Bloom filter as the Bloom filter of the combined file obtained by combining the different to-be-combined files.

The preset capacity is a capacity that can ensure the expected false positive rate and that is determined according to the quantity of files expected to be combined. Therefore, when the quantity of to-be-combined files is less than or equal to the quantity of files expected to be combined, the Bloom filter of the combined file may be generated using the first generating submodule.

For a specific relationship between the preset capacity and the quantity of files expected to be combined, reference may be made to method embodiments, which is not described herein again.

The determining module 405 is configured to, when the result of the first judging module 402 is that the quantity of deletion records in the to-be-combined files acquired by the first acquiring module falls outside the false positive permission range, or when the result of the second judging module 4041 is that the quantity of to-be-combined files is greater than the quantity of files expected to be combined, determine, when the to-be-combined files are combined, a primary key of data that is of each record and that is obtained in a combination process.

The second generating module 406 is configured to perform a hash calculation on a key value of the primary key of data, and map an obtained hash value to a corresponding location in a Bloom filter preset to be combined.

When the quantity proportion of the deletion records to all the records in the to-be-combined files is greater than the preset threshold, or the quantity of to-be-combined files is greater than the quantity of files expected to be combined, the Bloom filter that is of the combined file and that is generated by the first generating module 404 cannot meet an expected false positive rate requirement. Therefore, the Bloom filter of the combined file may be generated in an existing manner by means of a hash calculation and according to a primary key of data that is of the combined file and that is determined when the to-be-combined files are combined. When the expected false positive rate is determined, a capacity of the Bloom filter preset to be combined may be determined according to a formula $m=n*\log_2 e*\log_2(1/f) \approx n*1.44*\log_2(1/f)$.

The to-be-combined files are combined in a recursive combination manner.

The preset threshold may be dynamically adjusted according to IO pressure of a storage medium. Therefore, the apparatus in this embodiment of the present disclosure may further include a detecting module 407 configured to detect whether IO pressure of the storage medium is greater than preset carrying pressure, and an adjusting module 408 configured to, when a result of the detecting module 407 is that the IO pressure of the storage medium is greater than the preset carrying pressure, decrease the preset threshold, and when the result of the detecting module is that the IO pressure of the storage medium is smaller than or equal to the preset carrying pressure, increase the preset threshold.

The detecting whether IO pressure of the storage medium is greater than carrying pressure may be performed in real time, such that the preset threshold can be relatively accurate, and a Bloom filter that is generated subsequently is more accurate.

The decreasing the preset threshold or the increasing the preset threshold may be implemented in multiple manners, for example, a current preset threshold is decreased or increased by a preset value each time, or the preset threshold is decreased or increased to a target threshold. The present disclosure sets no specific limitation thereto.

The detecting whether IO pressure of the storage medium is greater than preset carrying pressure may be implemented in multiple implementation manners, and in a possible implementation manner, the detecting module 407 may include a testing module 4071 configured to test a maximum read speed of the storage medium, and a detecting submodule 4072 configured to detect whether a real-time read speed of the storage medium is greater than the maximum read speed, and when the real-time read speed of the storage medium is greater than the maximum read speed, determine that the IO pressure is greater than the carrying pressure.

The maximum read speed may be tested using an Iometer testing tool, and an Iometer is a tool that works on a single system and a cluster system and that is used to measure and describe IO, and the Iometer may detect and record performance of an IO operation and impact of the IO operation on a system.

When the real-time read speed of the storage medium reaches the maximum read speed, it can be considered that the IO pressure is relatively large and an increase of a quantity of misreading times of a disk may be caused by an increase of the false positive rate, and therefore, the preset threshold may be decreased. Otherwise, the preset threshold may be increased.

In this embodiment, for to-be-combined files, when a quantity proportion of deletion records in the to-be-combined files to all records in the to-be-combined files is less than or equal to a preset threshold, and a quantity of to-be-combined files is less than a quantity of files expected to be combined, a bitwise OR operation is separately performed on bit values at same locations in Bloom filters that are of different to-be-combined files and that are generated according to a preset capacity, and an obtained target Bloom filter is used as a Bloom filter of a combined file. Therefore, there is no need to perform a hash function calculation on each element of the combined file, that is, a primary key of data for multiple times, and to perform an operation such as mapping and modifying a bit value of the Bloom filter, and the Bloom filter of the combined file may be directly obtained in a combination manner, which reduces an amount of calculation processing, reduces occupation of a system resource, and reduces resource overheads.

The Bloom filter generation apparatus according to the foregoing several embodiments of the present disclosure may be integrated, in actual disclosure, into a storage device that includes a storage medium. A key-value distributed storage system includes multiple storage nodes, and the Bloom filter generation apparatus described in the present disclosure may be integrated into any storage node. According to a storage device that is equipped with the apparatus described in the present disclosure, a Bloom filter of a combined file can be obtained in a combination manner. There is no need to perform a hash calculation for multiple times, and an operation such as mapping and modifying a bit value, which can reduce an amount of calculation processing, reduce occupation of a system resource, and reduce resource overheads.

It can be learned from the foregoing description that, a person skilled in the art may clearly understand that the present disclosure may be implemented using software in addition to a necessary universal hardware platform. Therefore, the present disclosure further provides a storage device, and the storage device mainly includes a memory and a processor connected to the memory using a bus.

The memory stores a Bloom filter generation program.

The processor runs the Bloom filter generation program.

The generation program may include program code, where the program code includes a computer operation instruction.

The processor may be a central processing unit (CPU), an application-specific integrated circuit (ASIC), or one or more integrated circuits configured to implement this embodiment of the present invention.

The memory may include a high speed random access memory (RAM), or may further include a non-volatile memory, for example, at least one magnetic disk memory.

The Bloom filter generation program may further include a first acquiring module, a first judging module, a second acquiring module, a first generating module, and the like.

For specific implementation of modules of the Bloom filter generation program, reference may be made to corresponding modules shown in FIG. 3 and FIG. 4, which is not described herein again.

The embodiments in this specification are all described in a progressive manner, for same or similar parts in the embodiments, reference may be made to these embodiments, and each embodiment focuses on a difference from other embodiments. The apparatus disclosed in the embodiments is basically similar to the method disclosed in the embodiments, and therefore is described briefly. For related parts, reference may be made to partial descriptions of the method.

It should be noted that in this specification, relational terms such as first and second are only used to distinguish one entity or operation from another, and do not necessarily require or imply that any actual relationship or sequence exists between these entities or operations. Moreover, the terms "include", "comprise", or their any other variant is intended to cover a non-exclusive inclusion, such that a process, a method, an article, or an apparatus that includes a list of elements not only includes those elements but also includes other elements which are not expressly listed, or further includes elements inherent to such process, method, article, or apparatus. An element preceded by "includes a . . . " does not, without more constraints, preclude the existence of additional identical elements in the process, method, article, or apparatus that includes the element.

For ease of description, the foregoing apparatus is described by dividing the functions into various units. Certainly, when the present disclosure is implemented, the functions of each unit may be implemented in one or more pieces of software and/or hardware. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some communication interfaces. The indirect couplings or communication connections between the apparatuses or units may be implemented in electronic, mechanical, or other forms.

Based on the foregoing descriptions of the implementation manners, a person skilled in the art may clearly understand that the present disclosure may be implemented by software in addition to a necessary general hardware platform. Based on such an understanding, the technical solutions of the present disclosure essentially or the part contributing to the prior art may be implemented in a form of a software product. The computer software product may be stored in a storage medium, such as a read only memory (ROM)/RAM, a magnetic disk, or an optical disc, and includes several instructions for instructing a computer device (which may be a personal computer, a server, or a network device) to perform the methods described in the embodiments or some parts of the embodiments of the present disclosure.

The embodiments disclosed above are described to enable a person skilled in the art to implement or use the present disclosure. Various modifications to the embodiments are obvious to the person skilled in the art, and general principles defined in this specification may be implemented in other embodiments without departing from the spirit or scope of the present disclosure. Therefore, the present disclosure will not be limited to the embodiments described in this specification but extends to the widest scope that complies with the principles and novelty disclosed in this specification

What is claimed is:

1. A Bloom filter generation method, comprising:
   acquiring to-be-combined files, wherein at least one file of the to-be-combined files comprises a deletion record;
   acquiring a Bloom filter of each file of the to-be-combined files when a quantity of deletion records in the to-be-combined files falls within a false positive permission range, wherein capacities of Bloom filters of different to-be-combined files are the same;
   performing a bitwise OR operation on bit values at same locations in the Bloom filters of the different to-be-combined files in order to obtain a target Bloom filter; and
   applying the target Bloom filter to a combined file obtained by combining the different to-be-combined files.

2. The method according to claim 1, wherein the quantity of deletion records in the to-be-combined files that falls within the false positive permission range is a quantity of deletion records resulting in a proportion of the deletion records to all records in the to-be-combined files being less than or equal to a preset threshold.

3. The method according to claim 2, further comprising:
  detecting whether input/output (IO) pressure of a storage medium is greater than a carrying pressure; and
  decreasing the preset threshold when the IO pressure of the storage medium is greater than the carrying pressure.

4. The method according to claim 3, wherein detecting whether IO pressure of the storage medium is greater than the carrying pressure further comprises:
  testing a maximum read speed of the storage medium;
  detecting whether a real-time read speed of the storage medium is greater than the maximum read speed; and
  determining that the IO pressure is greater than the carrying pressure when the real-time read speed of the storage medium is greater than the maximum read speed.

5. The method according to claim 2, further comprising:
  detecting whether input/output (IO) pressure of a storage medium is greater than a carrying pressure; and
  increasing the preset threshold when the IO pressure of the storage medium is less than or equal to the carrying pressure.

6. The method according to claim 1, wherein the Bloom filter of each file fo the to-be-combined files generated according to a preset capacity, and wherein the preset capacity is determined according to a quantity of files expected to be combined.

7. The method according to claim 6, wherein performing the bitwise OR operation on bit values at same locations in the Bloom filters of the different to-be-combined files comprises performing the bitwise OR operation on the bit values at the same locations in the Bloom filters of the different to-be-combined files when a quantity of the to-be-combined files is less than or equal to the quantity of files expected to be combined.

8. The method according to claim 1, wherein performing the bitwise OR operation on bit values at same locations in the Bloom filters of the different to-be-combined files in order to obtain the target Bloom filter comprises performing the bitwise OR operation on the bit values at the same locations in the Bloom filters of the different to-be-combined files at the same time of combining the to-be-combined files in order to obtain the target Bloom filter files in order to obtain to the Bloom filter.

9. A Bloom filter generation apparatus, comprising:
  a non-transitory computer-readable storage medium configured to store programming instructions; and
  a processor coupled to the non-transitory computer-readable storage medium, wherein the processor is configured to:
    acquire to-be-combined files, wherein at least one file of the to-be-combined files comprises a deletion record;
    acquire a Bloom filter of each to-be-combined file when a quantity of deletion records in the to-be-combined files falls within a false positive permission range, wherein capacities of Bloom filters of different to-be-combined files are the same;
    perform a bitwise OR operation on bit values at same locations in the Bloom filters of the different to-be-combined files in order to obtain a target Bloom filter; and
    apply the target Bloom filter to a combined file obtained by combining the different to-be-combined files.

10. The apparatus according to claim 9, wherein the quantity of deletion records in the to-be-combined files that falls within the false positive permission range is a quantity of deletion records resulting in a proportion of the deletion records to all records in the to-be-combined files being less than or equal to a preset threshold.

11. The apparatus according to claim 10, wherein the processor is further configured to:
  detect whether input/output (IO) pressure of a storage medium is greater than a carrying pressure; and
  decrease the preset threshold when the IO pressure of the storage medium is greater than the carrying pressure.

12. The apparatus according to claim 11, wherein the processor is further configured to:
  test a maximum read speed of the storage medium;
  detect whether a real-time read speed of the storage medium is greater than the maximum read speed; and
  determine that the IO pressure is greater than the carrying pressure when the real-time read speed of the storage medium is greater than the maximum read speed.

13. The apparatus according to claim 10, wherein the processor is further configured to:
  detect whether input/output (IO) pressure of a storage medium is greater than a carrying pressure; and
  increase the preset threshold when the IO pressure of the storage medium is less than or equal to the carrying pressure.

14. The apparatus according to claim 9, wherein the Bloom filter of each to-be-combined file is generated according to a preset capacity, wherein the preset capacity is determined according to a quantity of files expected to be combined.

15. The apparatus according to claim 14, wherein the processor is further configured to perform the bitwise OR operation on the bit values at the same locations in the Bloom filters of the different to-be-combined files when a quantity of the to-be-combined files is less than or equal to the quantity of files expected to be combined.

16. The apparatus according to claim 9, wherein the processor is further configured to perform the bitwise OR operation on the bit values at the same locations in the Bloom filters of the different to-be-combined files, at the same time of combining the to-be-combined files, in order to obtain the target Bloom filter and apply the target Bloom filter as the Bloom filter of the combined file obtained by combining the different to-be-combined files.

17. A computer product comprising computer executable instructions stored on a non-transitory computer-readable medium, wherein a processor is coupled to the non-transitory computer-readable medium, and wherein executing the instructions causes the processor to:
  acquire to-be-combined files, wherein the to-be-combined files comprise a deletion record;
  acquire a Bloom filter of each to-be-combined file when a quantity of deletion records in the to-be-combined files falls within a false positive permission range, wherein capacities of Bloom filters of different to-be-combined files are the same; and
  perform a bitwise OR operation on bit values at same locations in the Bloom filters of the different to-be-combined files in order to obtain a target Bloom filter; and
  apply the target Bloom filter to a combined file obtained by combining the different to-be-combined files.

18. The product according to claim 17, wherein the Bloom filter of each to-be-combined file is generated according to a preset capacity, wherein the preset capacity is determined according to a quantity of files expected to be combined.

19. The product according to claim 18, wherein the processor is further configured to perform the bitwise OR operation on the bit values at the same locations in the Bloom filters of the different to-be-combined files when a quantity of the to-be-combined files is less than or equal to the quantity of files expected to be combined.

20. The product according to claim 17, wherein the processor is further configured to perform the bitwise OR operation on the bit values at the same locations in the Bloom filters of the different to-be-combined files, at the same time of combining the to-be-combined files, in order to obtain the target Bloom filter and use the target Bloom filter as the Bloom filter of the combined file obtained by combining the different to-be-combined files.

\* \* \* \* \*

UNITED STATES PATENT AND TRADEMARK OFFICE
CERTIFICATE OF CORRECTION

PATENT NO. : 10,664,445 B2
APPLICATION NO. : 15/044273
DATED : May 26, 2020
INVENTOR(S) : Yong Li and Junhua Zhu It is certified that error appears in the above-identified patent and that said Letters Patent is hereby corrected as shown below:

On the Title Page

Item (30), Foreign Application Priority Data: Missing information, should read "CN201310382258.8 August 28, 2013"

In the Claims

Claim 8, Column 19, Line 43 and 44: "target Bloom filter files in order to obtain to the Bloom filter." should read "target Bloom filter."

Signed and Sealed this
Twenty-first Day of July, 2020

Andrei Iancu
*Director of the United States Patent and Trademark Office*